Aug. 7, 1934.　　　　G. L. SMITH　　　　1,969,162
KITCHEN UTENSIL
Filed Nov. 8, 1932
Fig. 1.
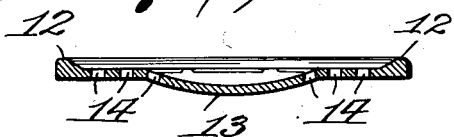
Fig. 2.
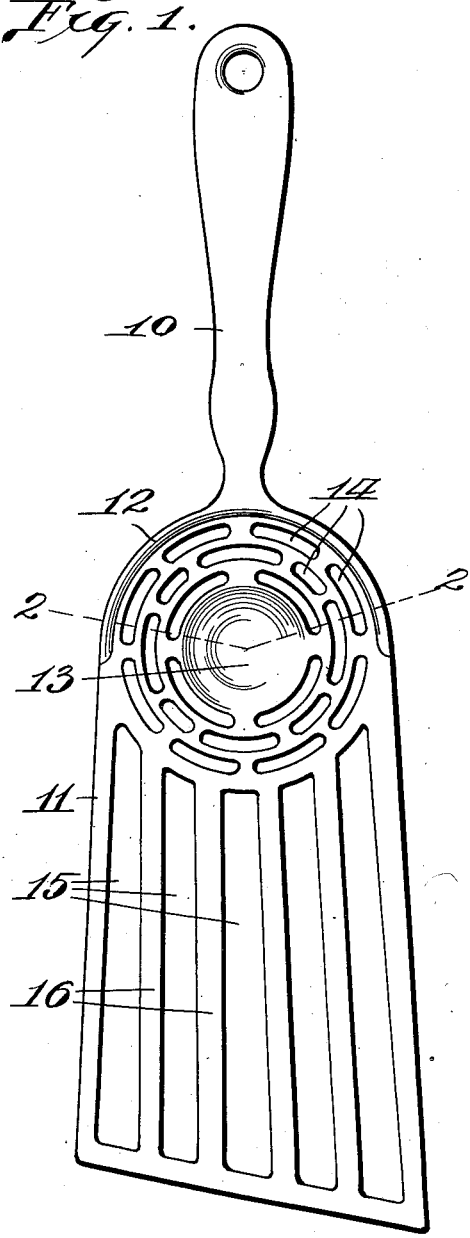
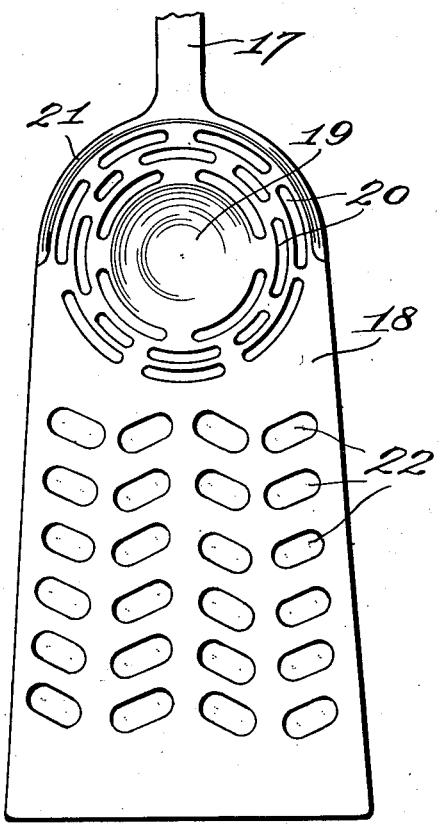
Fig. 3.
INVENTOR,
GERTRUDE L. SMITH.
By Martin C. Smith, ATTY.

Patented Aug. 7, 1934

1,969,162

UNITED STATES PATENT OFFICE 1,969,162

KITCHEN UTENSIL

Gertrude L. Smith, Los Angeles, Calif.

Application November 8, 1932, Serial No. 641,755

1 Claim. (Cl. 259—144)

My invention relates to a kitchen utensil that is especially designed for use for beating or stirring various food products such as eggs, batter, salad dressings and the like and for conveniently separating the whites and yolks of eggs and which device may also function as a spatula or spoon for the lifting, turning and draining of various food products while the same are being prepared, cooked or baked.

The principal objects of my invention are, to provide a relatively simple, practical and inexpensive implement that is preferably formed from a single piece of material and which comprises a handle and a perforated plate that functions as a beater or stirrer, as a spoon or spatula for lifting, turning and manipulating various food products and also for the separation of the whites of eggs from the yolks thereof.

With the foregoing and other objects in view, my invention consists in certain novel features of construction and arrangements of parts that will be hereinafter more fully described and claimed and illustrated in the accompanying drawing in which:

Fig. 1 is a top plan view of a kitchen utensil constructed in accordance with my invention and which is especially designed for use as a beater or stirrer and an egg separator.

Fig. 2 is an enlarged cross section taken on the line 2—2 of Fig. 1.

Fig. 3 is a plan view of the perforated plate or spoon portion of a utensil embodying my invention and which is especially designed for use as a spatula or spoon for lifting and turning and draining various food products and for effecting the separation of eggs.

Referring by numerals to the accompanying drawing and particularly to the form of utensil illustrated in Figs. 1 and 2, 10 designates a handle which may be of any desired length, and formed integral with or fixed to the forward end of said handle, is an elongated plate 11, which may be of any desired size and shape.

In the production of my improved utensil, I prefer to form the handle and plate from a single piece of sheet metal, coated with tin or other suitable metal or enamel or the handle may be composed of wood, hard rubber or composition.

The rear end of plate 11 or that end that is connected to the handle 10, is preferably formed on a half circle, and formed on this curved edge and on the top of the plate, is a narrow upwardly projecting lip or flange 12 that serves to prevent spreading of an egg when the same is broken and the contents thereof deposited on the rear portion of the plate for the purpose of separating the white from the yolk.

A portion of the plate 11 directly in front of the curved rear edge and flange 12, is slightly depressed, as designated by 13, in order to form a shallow recess that receives and holds the egg yolk while the white is separating therefrom.

Formed through the rear portion of the plate and surrounding the shallow depression therein, are slots or openings 14, preferably arcuate in form and which provide openings through which the whites of the eggs may readily pass, thereby leaving the yolk of the egg in the central depression. These slots or openings may be of any size or shape desired.

That portion of plate 11 between the slots 14 and the forward end of said plate, is provided with a series of elongated openings 15 that are substantially parallel with each other and with the side of the plate.

These openings terminate adjacent to the forward end of the plate and the material in the plate between said openings provides a series of narrow strips or fingers 16 that are effective when the utensil is utilized for beating or stirring liquid or semi-liquid products.

Referring by numerals to the accompanying drawing and particularly to the form of utensil illustrated in Figs. 1 and 2, 10 designates a handle which may be of any desired length and formed integral with or fixed to the forward end of said handle, is an elongated plate 11, which may be of any desired size and shape.

In the production of my improved utensil, I prefer to form the handle and plate from a single piece of sheet metal and the entire surface of the utensil may be plated or coated with tin or other suitable metal or enamel.

The rear end of plate 11 or that end that is connected to the handle 10, is preferably formed on a half circle and formed on this curved edge and on the top of the plate, is a narrow upwardly projecting lip or flange 12 that serves to prevent spreading of an egg when the same is broken and the contents thereof deposited on the rear portion of the plate for the purpose of separating the white from the yolk.

A portion of the plate 11 directly in front of the curved rear edge and flange 12, is slightly depressed, as designated by 13, in order to form a shallow recess that receives and holds the egg yolk while the white is separating therefrom.

Formed through the rear portion of the plate and surrounding the shallow depression therein, are slots or openings 14, preferably arcuate in form and which provide openings through which the whites of the eggs may readily pass, thereby leaving the yolk of the egg in the central depression. These slots or openings may be of any size or shape desired.

That portion of plate 11 between the slots 14 and the forward end of said plate, is provided with a series of elongated openings 15 that are substantially parallel with each other and with the side edges of the plate.

These openings terminate adjacent to the forward end of the plate and the material in the plate between said openings provides a series of narrow strips or fingers 16 that are effective when the utensil is utilized for beating or stirring liquid or semi-liquid food products.

The form of device illustrated in Fig. 3 and which is especially designed for lifting, turning and draining various food products, comprises a handle 17 of any suitable length and formed integral with or fixed to the forward end of said handle, is an elongated plate 18, which functions as a paddle or spatula. If desired, the plate 18 may be substantially oval in shape similar to the bowl of a large spoon.

The rear portion of plate 18 is constructed the same as the rear portion of plate 11, so as to form an egg separator that comprises a shallow depression 19 surrounded by slots or openings 20 and the curved rear edge of said rear portion being provided on its upper face with a marginal upstanding flange 21.

Formed through plate 18 in the area between the egg separator and the forward edge of said plate, are apertures 22, which may be of any size, shape and arrangement.

These openings permit liquid or semi-liquid food products to readily pass through the plate when this form of utensil is used as a stirrer or beater and said openings also permit liquid or semi-liquid to pass through the plate when the same is used for lifting and draining food products during preparation or cooking.

Both forms of my improved utensil may be used for beating and stirring food products, likewise for lifting, turning and draining various food products during preparation and cooking and to effect the separation of an egg, the same is broken and deposited on the rear portion of the plate or main body of the utensil and the white of the egg will discharge through the openings 14 or 20 while the yolk remains in the shallow depression in the center of the area or openings.

Thus it will be seen that I have provided a kitchen utensil that is relatively simple in construction, inexpensive of manufacture and very effective in performing the functions for which it is intended.

It will be understood that minor changes in the size, form and construction of the various parts of my improved kitchen utensil may be made and substituted for those herein shown and described without departing from the spirit of the invention, the scope of which is set forth in the appended claim.

I claim as my invention:

A kitchen utensil comprising a handle, a plate secured to the forward end of said handle, said plate having a semi-circular rear edge, an upstanding flange formed on said semi-circular rear edge, said plate being provided with a circular depression that is concentrically arranged relative to the semi-circular rear edge of the plate, there being a plurality of concentrically arranged rows of arcuate apertures formed through the plate and surrounding said circular depression, certain of which apertures are disposed between the depression and the upstanding flange on the rear edge of said plate and the body of the plate in front of said concentric rows of apertures being provided with openings.

GERTRUDE L. SMITH.